United States Patent [19]
Dickson

[11] Patent Number: 4,911,804
[45] Date of Patent: Mar. 27, 1990

[54] ELECTROCHEMICAL REACTOR FOR COPPER REMOVAL FROM BARREN SOLUTIONS

[75] Inventor: Graham C. Dickson, Mississauga, Canada

[73] Assignee: Celec Inc., Mississauga, Canada

[21] Appl. No.: 151,230

[22] Filed: Feb. 1, 1988

[51] Int. Cl.$^4$ ............................................. C25C 1/12
[52] U.S. Cl. ..................... 204/110; 204/109; 204/106; 204/114; 204/130; 204/267; 204/269; 204/275; 204/290 R; 204/292; 204/294
[58] Field of Search .............. 204/130, 149, 110, 109, 204/290 R, 292, 294, 106, 114, 115, 275

[56] References Cited

U.S. PATENT DOCUMENTS

| | | |
|---|---|---|
| 4,226,685 | 10/1980 | Portal et al. ................ 204/105 R |
| 4,396,474 | 8/1983 | Astruc et al. ................ 204/105 R |
| 4,445,990 | 5/1984 | Kim et al. .................... 204/151 |
| 4,556,469 | 12/1985 | Kim et al. .................... 224/263 |

Primary Examiner—John F. Niebling
Assistant Examiner—David G. Ryser
Attorney, Agent, or Firm—Kramer, Brufsky & Cifelli

[57] ABSTRACT

A system for treating a barren solution typically containing a heavy metal such as copper, and complexed cyanide, from a precious metal mill, is treated in a first electrochemical cell to remove the heavy metal and free the cyanide whereafter the treated solution can be returned to the precious metal mill as leaching solution; the barren solution flows through a porous cathode in which the heavy metal is electrochemically deposited, and against an inert anode; the deposited heavy metal is recovered in a sheet form by employing the heavy metal loaded cathode as an anode in a second electrochemical cell, the heavy metal entering solution and being deposited on a cathode sheet typically of stainless steel or titanium from which a deposited sheet of the heavy metal is readily peeled; the porous cathode free of heavy metal can be reused in the first cell.

19 Claims, 11 Drawing Sheets

ELECTROCHEMICAL REACTOR FOR COPPER REMOVAL FROM BARREN SOLUTIONS

BACKGROUND OF THE INVENTION (i) Field of the Invention

The present invention relates to an electrochemical method and apparatus for treating precious metal milling barren solutions to remove heavy metals which may be present in the barren solution, having leached from the ore or having been added as an integral part of the milling process.

(ii) Description of Prior Art

In many precious metal ore milling operations the precious metals, for example gold and silver, are leached from the comminuted ore by a solution of cyanide in water. During this leaching process heavy metal contaminants can also leach from the ore. The heavy metals form complex cyanides thereby reducing the concentration of free cyanide in solution available for the leaching of the precious metals.

The cyanide leaching solution when containing precious metals is called a pregnant solution and when the precious metals have been removed from it is termed barren. To reduce the costs of milling precious metal ores it is necessary to reuse the barren solution for leaching further ore. Excessive amounts of heavy metal contamination interfere with the metallurgical processes involved in the leaching and subsequent recovery of the precious metals. Therefore the reuse of barren solutions is limited by the presence of heavy metal contaminants. Disposal of the unusable barren solution to the environment is a further cost to the process. Copper is a common heavy metal contaminant in such milling solutions. Removal of copper from barren solutions allows a greater reuse of the barren solution and at the same time frees the complexed cyanide for reuse as a leaching agent for the precious metals. Accordingly it is desirable to remove copper from barren solutions in order, to decrease the cost of destroying cyanide in unreusable barren solution, to decrease the cost of precipitating and disposing of heavy metals in unreuseable barren solution and to decrease the amount of cyanide used in the milling process.

At the present time the problem of copper dissolution is solved either by adding excessive amounts of cyanide to the leaching solutions thereby increasing the cost of processing, and limiting this solution to those ores with a higher gold content, or by acidification of the barren solution to free the cyanide as a gaseous product to be readsorbed in fresh leaching solution.

SUMMARY OF THE INVENTION

It is an object of this invention to provide a method and apparatus for the removal of heavy metal and freeing of complexed cyanide in a barren solution from a precious metal mill process, whereby the resulting solution containing the freed cyanide can be recycled to the precious metal mill.

It is a further object of this invention to provide such a method and apparatus, in which the heavy metal is electrochemically deposited and subsequently redeposited in a sheet form, with regeneration of the porous cathode, and is readily recoverable in such sheet form.

In accordance with one aspect of the invention there is provided a method for treating a barren solution from a precious metal mill to remove heavy metal and free complexed cyanide which comprises passing or flowing the barren solution through a porous cathode and across the surface of an anode of an electrochemical cell.

A potential difference is maintained between the cathode and the anode to effect electrochemical deposition of the heavy metal in the porous cathode.

In accordance with the invention, the porous cathode has a high electrochemically active surface area per unit volume, so as to provide a large cathode surface area for deposition of the heavy metal. This may particularly be achieved by employment of a cathode material of high porosity, preferably a porosity in excess of 90%, so that the cathode can be loaded with a high level of heavy metal before requiring replacement.

It is found to be especially suitable to employ cathode materials of an evenly distributed or homogeneous, uniform porosity. In the case in which the heavy metal is copper the porosity should suitably permit loading of the cathode with a copper level of more than 0.5 g/cm$^3$ before replacement of the cathode becomes necessary.

In another aspect of the invention there is provided an apparatus for treating a barren solution from a precious metal mill process, to remove heavy metal contamination and free complexed cyanide comprising: an electrochemical cell having an anode and a porous cathode. The cell has an inlet for flow introduction of barren solution contaminated with heavy metal and containing complexed cyanide into the cell, and an outlet for flow discharge of treated solution from the cell. A flow path in the cell extends from the inlet to the outlet; the porous cathode is disposed in the flow path for flow of solution therethrough. In this way the cathode or at least the pores of the cathode form part of such flow path; the anode defines a wall or surface of the flow path for flow of the solution thereagainst.

As the heavy metals which can be removed from barren solution in accordance with the invention there may be mentioned, in particular, copper, cadmium and zinc.

DESCRIPTION OF PREFERRED EMBODIMENTS (i) Cathode

The cathode is in particular in the form of an electrically conductive felt or reticulated material, especially a carbon felt or reticulated carbon.

A carbon felt or reticulated carbon provides a high porosity particularly in excess of 90%; the high porosity provides a high cathode surface area which increases the reaction rate and enables continued electrochemical deposition of heavy metal from the barren solution even when the concentration of the heavy metal has been significantly diminished. In this way a higher quality treated solution may be recovered from the cell.

The preferred carbon felt is suitably formed of carbon fibres, these being fibres formed from the carbonization and/or graphitization of synthetic polymer fibres, for example, polyacrylonitrile or ester fibres. The felt may be formed from a pad of such carbon fibres, the pad being readily compressible. Such fibres may suitably have a diameter of the order of 6 to 8 microns, especially about 6 microns.

Since a pad of fibres is mechanically fragile, it is appropriate to mechanically support the carbon felt in a frame or assembly which serves to hold the felt in a planar state.

Desirably the felt should be supported under compression so as to have a planarity whereby a constant gap or separating distance is maintained between the cathode and the anode.

The cathode should, of course, be resistant to materials which may be present in the cell including cyanide and suitably should be resistant to both acid and alkaline media when used cathodically or anodically. Carbon felt and reticulated carbon meet these requirements.

The cathode should desirably have a high hydrogen overpotential so that the heavy metal is deposited in preference to liberation of hydrogen at the cathode. Suitably the cathode also has a high oxygen overpotential so that oxygen is not liberated in a significant way at the cathode when it is used as the anode. Carbon felt and reticulated carbon meet these requirements.

(ii) Anode

The anode is essentially impermeable to the barren solution and the resulting treated solution and is, in particular, a dimensionally stable electrode typically having a core of titanium sheet coated with a metal oxide, for example, one or more oxides of tantalum, iridium and platinum.

The anode suitably has a low oxygen overpotential such that hydroxide ions are discharged liberating oxygen in preference to cyanide ions.

(iii) Cell

The cathode and the anode form an electrolysis electrode assembly in the cell and the cell suitably has a plurality of such electrode assemblies, each assembly having a cathode and an anode with a gap therebetween.

A flow path for flow of solution being treated extends from an inlet to an outlet of the cell. The flow path provides a contact time between the flowing solution and the electrode assemblies sufficient for deposition of the heavy metal at the porous cathode.

The flow path may, in particular, comprise an inflow passage and an outflow passage extending across the cell in opposed generally parallel arrangement, with the plurality of electrode assemblies extending in spaced apart relationship between the inflow and outflow passages, and generally perpendicular thereto. A plurality of discrete branch passages between the electrode assemblies communicate with the inflow passage and extend towards but do not communicate directly with the outflow passage. The solution thus flows from the inflow passage into the plurality of branch passages and from there through an adjacent porous cathode into the gap between such cathode and its anode, the gap forms a gap passage communicating with the outflow passage and the solution flows along the gap passage against the anode and into the outflow passage and from there exits from the cell.

Suitably the gap passage is maintained as small as possible, for example, 1 cm or less.

In this way a plurality of discrete treatment flow paths is formed within the cell thereby maximizing the electrochemically active surface area of the cell per cell volume.

(iv) Treatment of Barren Solution

The barren solution containing heavy metal, for example, copper and complexed cyanide is fed from a precious metal mill to the electrochemical cell. In the case in which the heavy metal is copper this is typically in the form of cuprous ions and forms a complex with the cyanide ions, and possibly hydroxide ions.

In flowing through the porous cathode heavy metal, for example, copper, is discharged electrochemically within the porous structure, and hydroxide ions are preferentially discharged at the cathode, leaving the free, uncomplexed cyanide ions in solution. The treated solution flowing from the cell is thus rich in free, available cyanide ions and poor in heavy metal ions. The treated solution is recycled to the precious metal mill as leaching solution and may be replenished with fresh leaching solution.

Periodically as the porous cathode becomes loaded with deposited heavy metal, the electrode assemblies are removed and dismantled to separate the cathode assemblies containing the porous cathodes loaded with heavy metal from the electrode assemblies.

In a continuous operation barren solution may be continuously cycled from the precious metal mill to the electrochemical cell and treated solution recycled to the mill. During the short periods in which the electrode assemblies are removed from the cell for replacement of the loaded porous cathodes, the cycling of the barren solution to the cell can be temporarily interrupted without terminating the operation of the mill. In such case the barren solution may be fed along a closed loop back into the mill. The removal disassembly and reassembly of the electrode assemblies is readily carried out in a short period of time, whereafter recycling of the barren solution through the cell can be resumed.

Alternatively individual electrode assemblies can be removed and replaced while maintaining the other assemblies in the cell so that the recycling need not be interrupted. For this purpose it may be convenient to maintain spare or extra electrode assemblies so that replacement assemblies can be introduced without delay, the removed assemblies then being used to form fresh replacement assemblies.

A typical cell may have dimensions of 5 ft. +4 ft. +6 ft. with 20 $m^2$ geometric cathode surface area in which the porous cathode effectively provides a cathode surface of about 250,000 $m^2$, and operates with a potential difference across the cell of about 10V, the gap between cathode and anode being about 1 cm. Such a cell can treat a barren solution flow of 5cm/sec., typically having an initial copper concentration of 500 ppm., replacement of electrode assemblies being carried out at 24 hour intervals.

The flow of barren solution is desirably maintained low typically about 5 to 20 cm/sec. depending on the concentration of heavy metal. At high concentrations of heavy metal the flow rate is preferably at the lower end of the range. The pressure drop between the inflow passage and the outflow passage is effectively zero, so that the pressure drop through the porous cathode governs the flow rate, this flow rate being governed by the porosity

(v) Formation of Sheet Heavy Metal

The heavy metal deposited within the porous cathode is converted to a sheet form with regeneration of the porous cathode by introducing the cathode assembly loaded with heavy metal into a stripping unit.

In the stripping unit each heavy metal loaded porous cathode is rendered anodic to an adjacent sheet metal cathode, typically of stainless steel. An aqueous electrolyte is established in the stripping unit and a potential difference is established between the anode and cathode of the stripping unit; the heavy metal in the anodic porous cathode from the cell enters into solution in the electrolyte and is deposited on the cathode sheet in a sheet form.

In this way the anodic porous cathode is freed of heavy metal and thereby regenerated for use in the electrochemical cell, and the heavy metal is deposited in sheet form on the cathode sheet of the stripping unit. The sheet of heavy metal is readily peeled or stripped from the cathode sheet of the stripping unit.

The sheet metal cathode should be of a metal which forms a metal oxide film on its surface, for example, stainless steel or titanium, whereby the sheet of heavy metal can be readily stripped from the oxide surface.

In yet another aspect of the invention there is provided an electrochemical recovery system which has a first circuit for electrochemically removing heavy metal from barren solution from a precious metal mill, and a second circuit for plating the removed heavy metal as a metal sheet.

The first circuit produces a treated solution rich in free, uncomplexed cyanide and poor in heavy metal which can be cycled as leaching solution to a precious metal mill.

DESCRIPTION OF PREFERRED EMBODIMENTS WITH REFERENCE TO THE DRAWINGS

Figure 1:
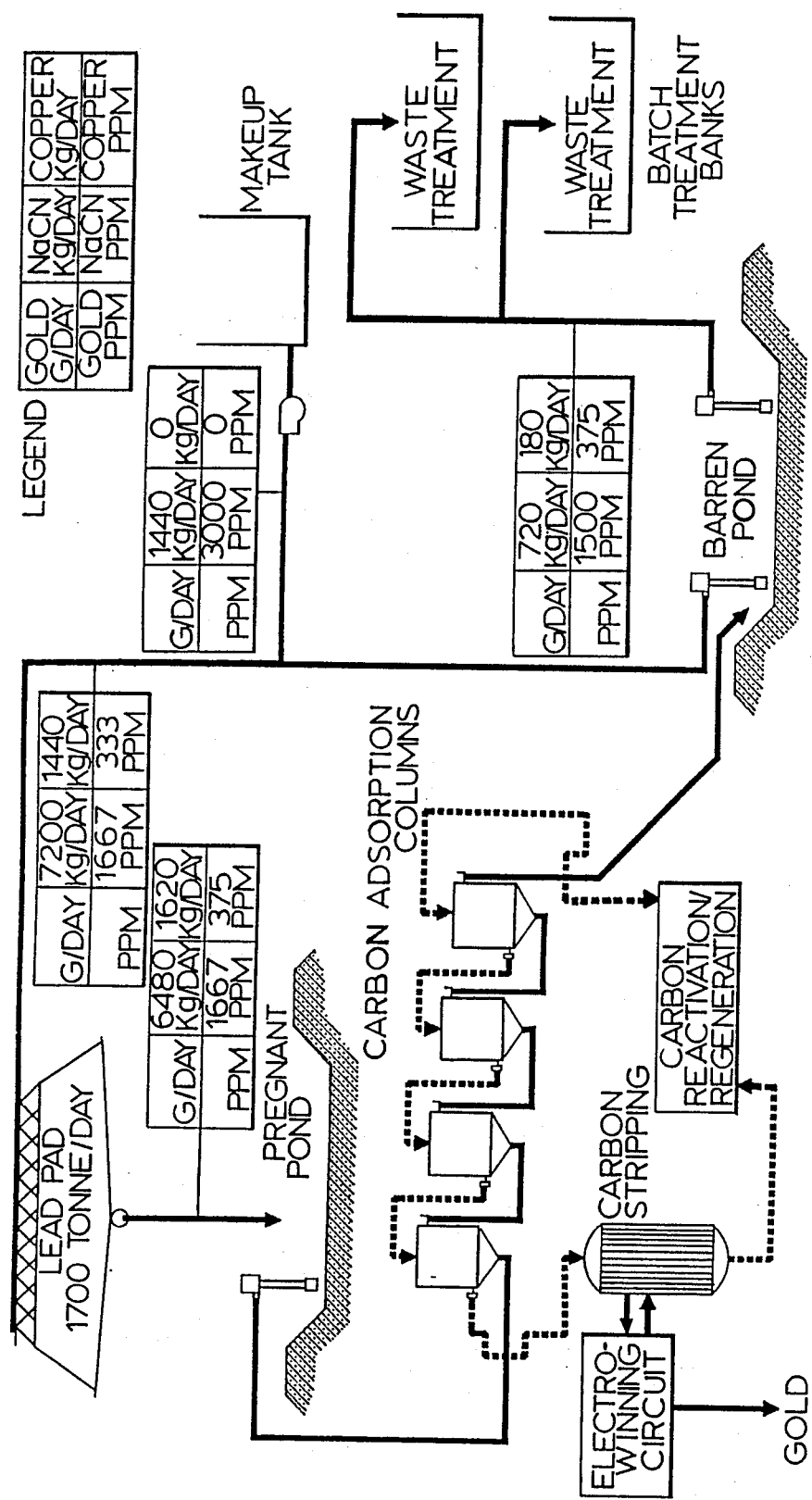
FIG. 1 is a schematic representation in flowsheet form of a typical leach precious metal milling operation.

With particular reference to FIG. 1, there is shown a typical flow sheet for a leach milling operation for recovery of precious metal, wherein dissolved copper creates a problem resulting in the requirement of bleed off of some of the solution, with destruction of the cyanide and precipitation of copper.

Figure 2:
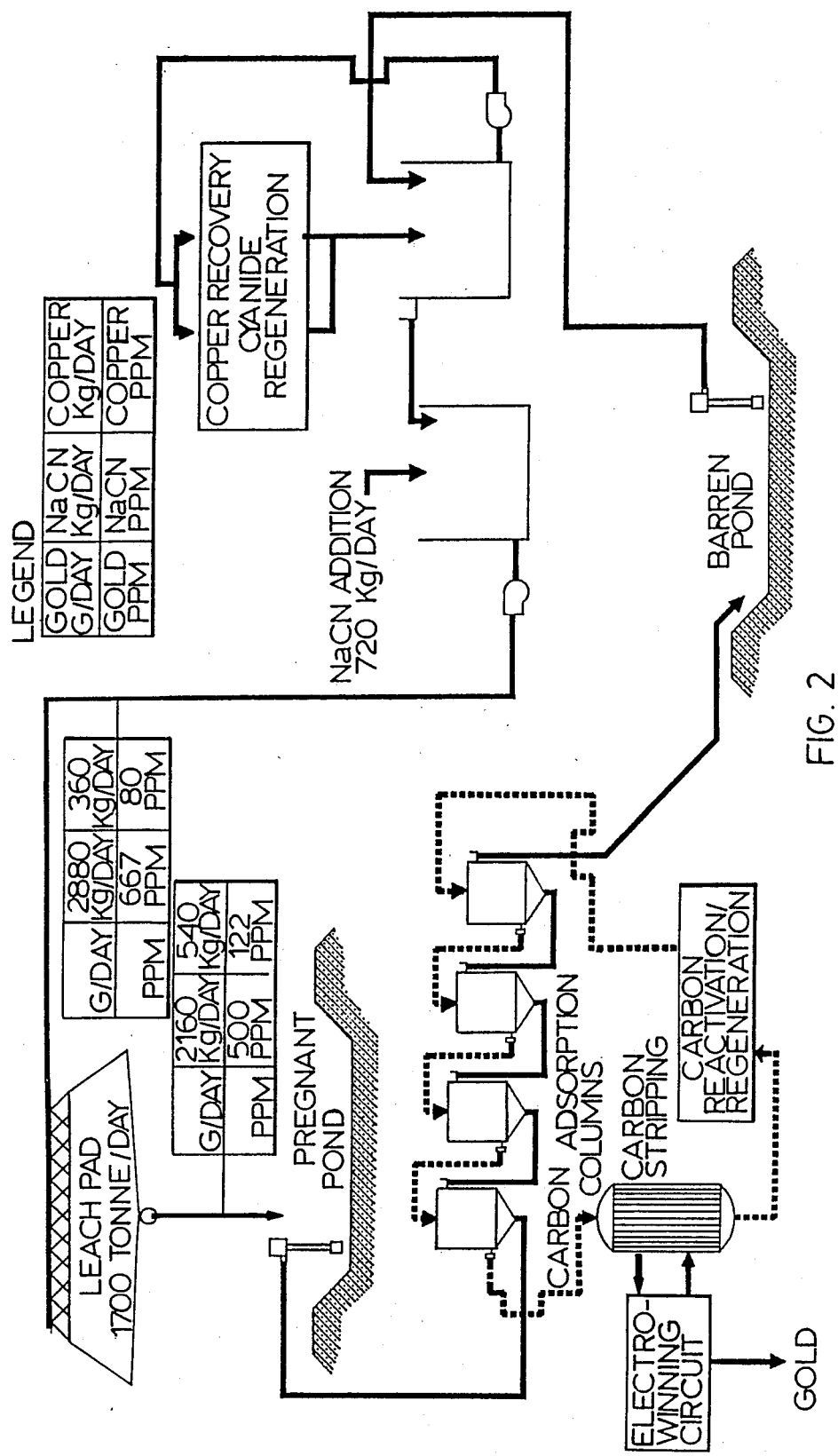
FIG. 2 is a schematic representation, similar to FIG. 1, but replacing the bleed and destruction systems with a system in accordance with the invention.

With further reference to FIG. 2, the assembly illustrated in FIG. 1 has been modified to incorporate a system 200 of the invention for recovery of the copper and cyanide regeneration.

Figure 3:
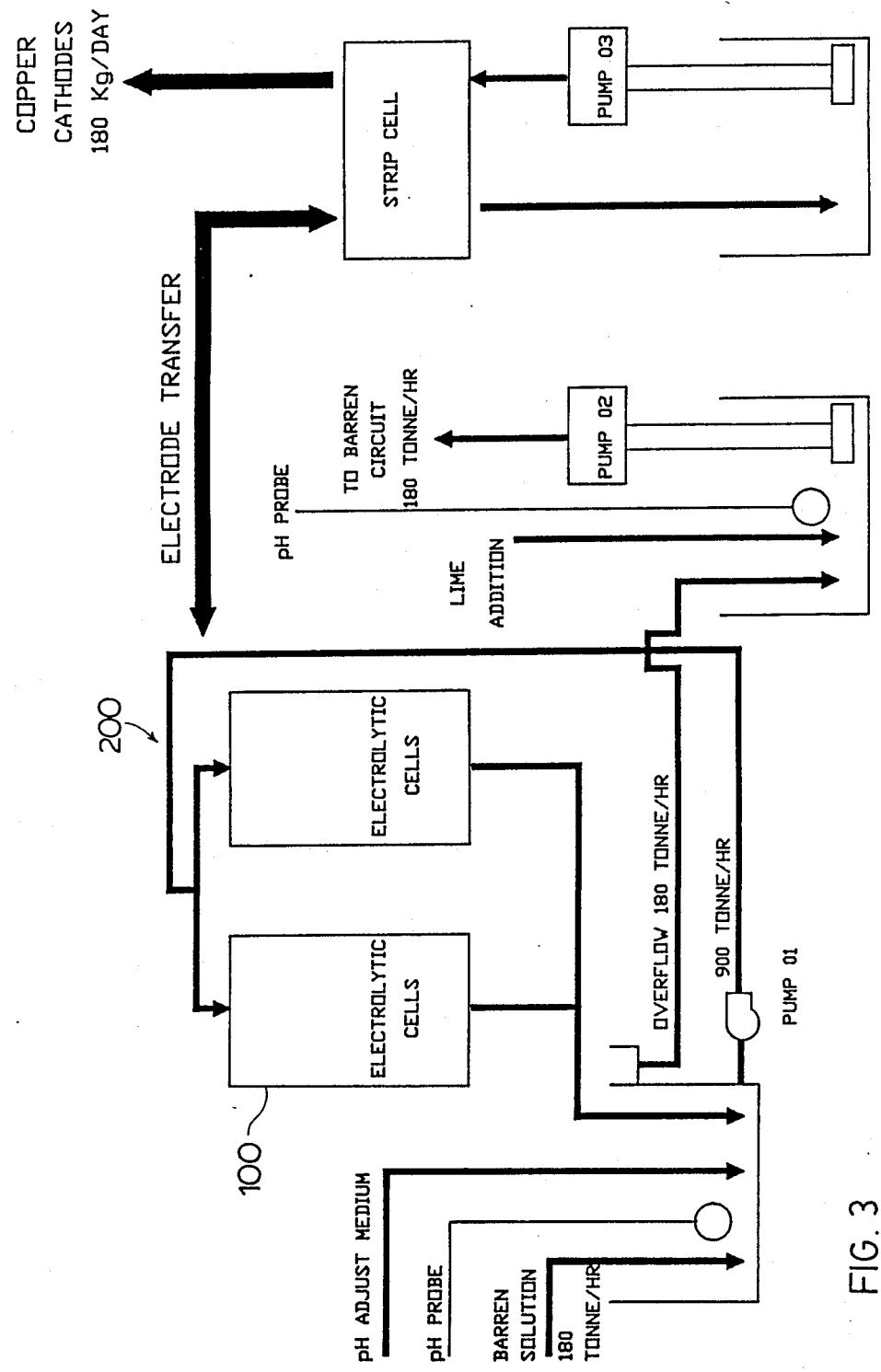
FIG. 3 is a schematic representation of the system of the invention as part of the milling circuit of an operation such as that of FIG. 1.

With further reference to FIG. 3, there is shown in greater detail, a system 200 of the invention in the milling circuit, including electrochemical cell 100 for treating barren solution and plating cell 140.

With further reference to FIGS. 4 to 9, electrochemical cell 100 has an inlet 102 and an outlet 104.

Inlet 102 communicates with an inflow passage 17 and outlet 104 is in communication with an outflow passage 2.

A plurality of electrode assemblies 106 is housed in cell 100 including a pair of end electrode assemblies 108, 110 and a plurality of intermediate electrode assemblies 112.

Each of end assemblies 108 and 110 includes a cathode assembly 114 supporting a porous cathode 12 spaced from a dimensionally stable anode 10.

Each of intermediate electrode assemblies 112 includes a pair of cathode assemblies 114 each supporting a porous cathode 12 spaced from a single dimensionally stable anode 10, therebetween.

Flow passages 16 are defined between adjacent intermediate electrode assemblies 112 and between intermediate electrode assemblies 112 and end electrode assemblies 108 and 110, respectively. The flow passages 16 communicate with in-flow passage 17 but are closed adjacent out-flow passage 2 by caps 4.

The electrode assemblies 106 are pressed together as an assembly between a pair of end supports 160 comprising inner end plates 1, suitably of PVC, and outer end plates 18, suitably of steel.

Cell 100 includes a plurality of cathode supports 19 each comprising cathode feeder 3 suitably in box section of mild steel sheet.

Figure 4:
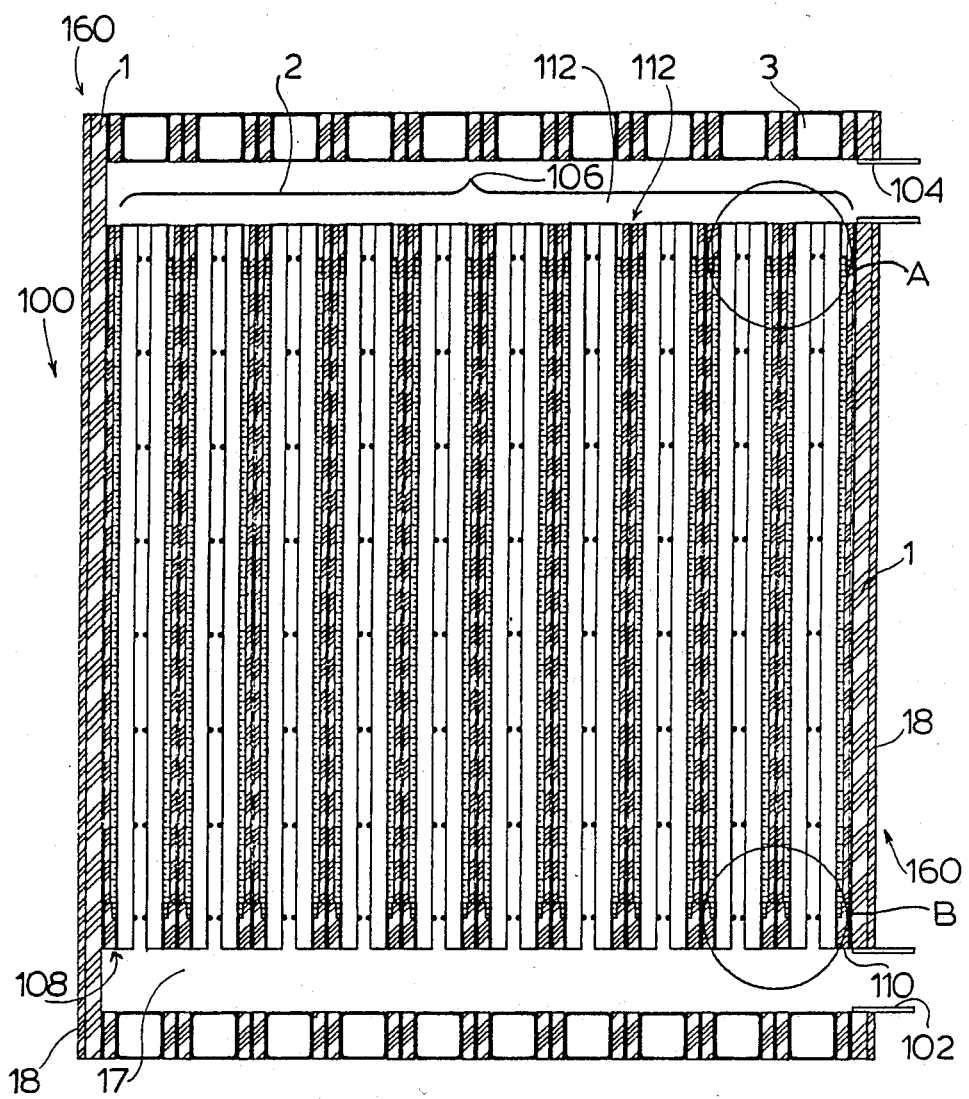
FIG. 4 is a side view of the interior of an electrochemical cell in accordance with the invention, for removing heavy metal from barren solution and freeing complexed cyanide.
Figure 5:
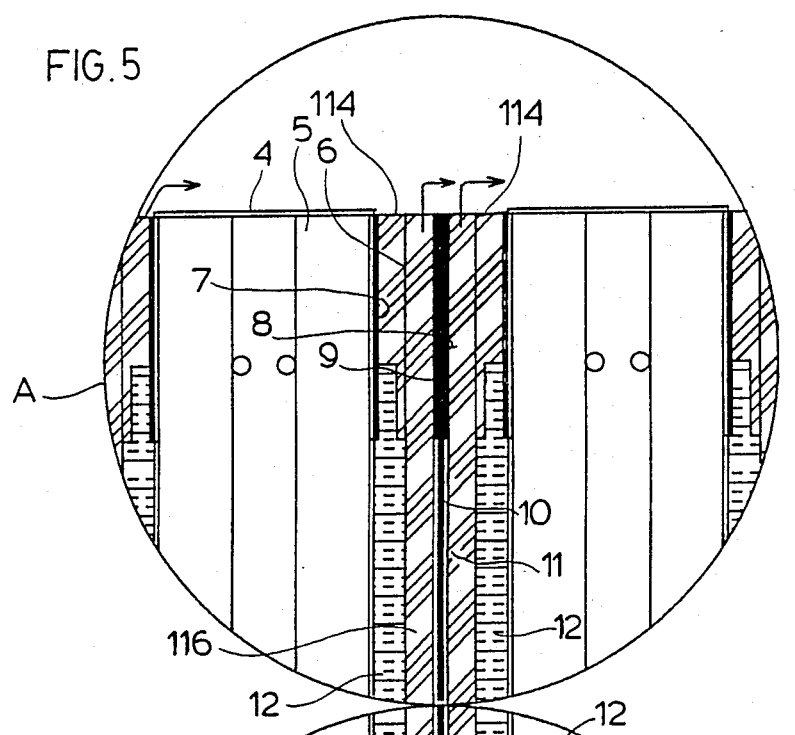
FIGS. 5 and 6 are enlarged views of details A and B of FIG. 4, respectively.
Figure 6:
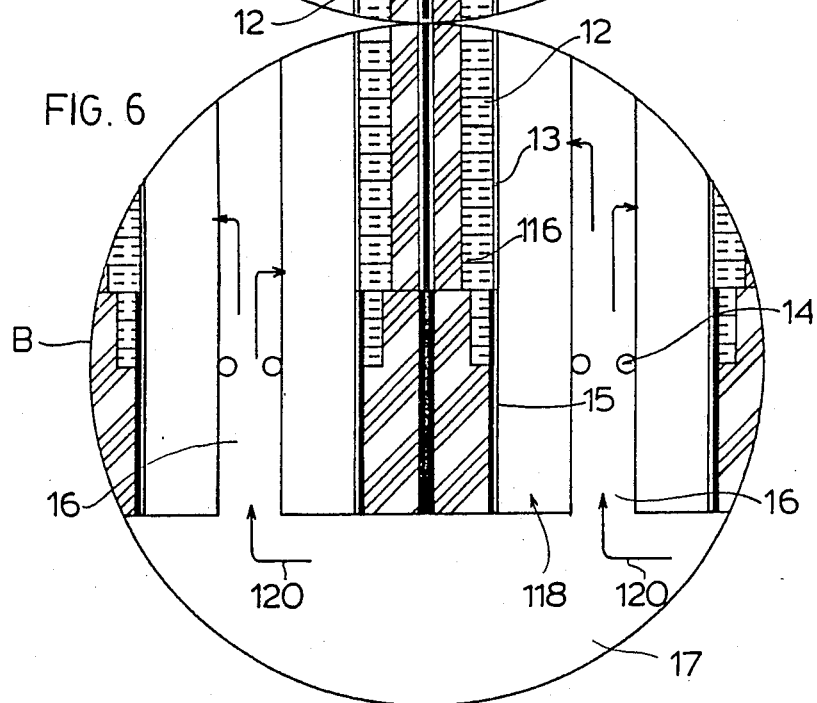
Figure 7:
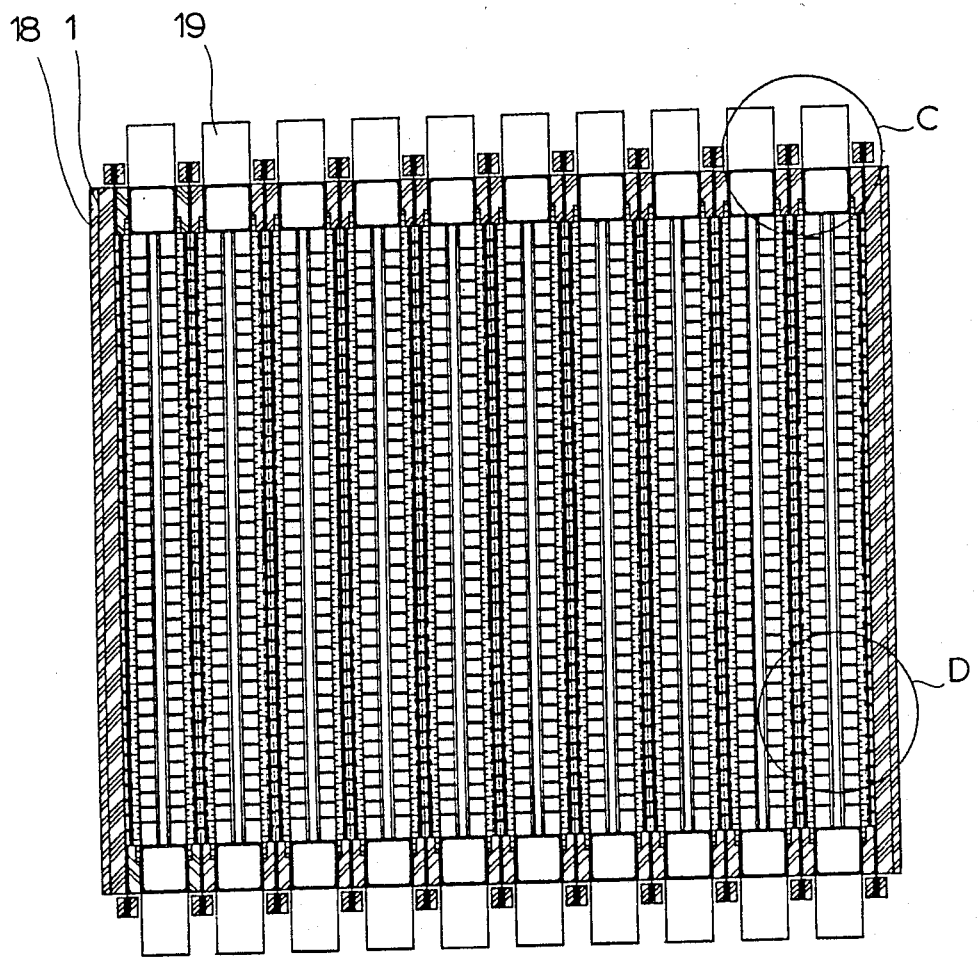
FIG. 7 is a top plan view of the interior of the cell of FIG. 4.

With particular reference to FIGS. 5 and 6 which show an enlargement of details A and B of FIG. 4, each cathode assembly 114 comprises a frame 6 and a porous cathode 12 suitably a carbon fibre felt supported between a grid 116 and a grid 118.

A metal feeder sheet 13, conveniently an expanded stainless steel sheet having a plurality of orifices, is supported between cathode 12 and grid 118.

Grid 116 is conveniently of PVC and comprises a plurality of spaced apart vertical members 11 and a plurality of spaced apart horizontal members 23.

Grid 118 is conveniently of mild steel and comprises a plurality of spaced apart vertical members 5 and a plurality of spaced apart horizontal members 14.

The grid 116 hold the porous cathode 12 with a required degree of planarity, in spaced relationship with anode 10.

With particular reference to FIG. 5, outer gaskets 7 are disposed between feeder sheets 13 and frame 6 adjacent out-flow line 2 and outer gaskets 15 are similarly disposed adjacent in-flow passage 17.

Gaskets 8 and 9 are disposed between opposed sides of anode 10 and grids 116 in the vicinity of out-flow passage 2 and in-flow passage 17.

The gaskets 7, 8, 9 and 15 are suitably of neoprene.

Figure 8:
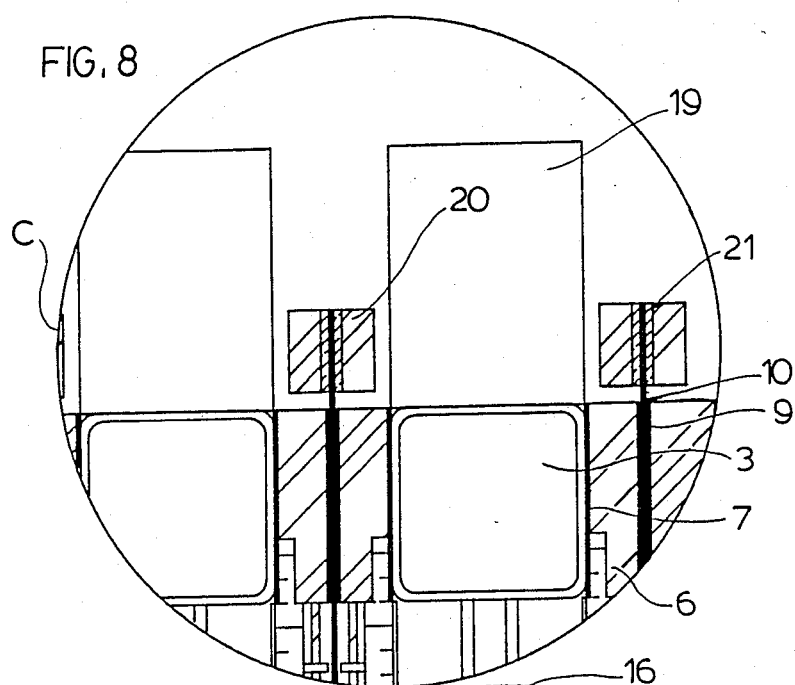
FIGS. 8 and 9 are enlarged views of details C and D, respectively, of FIG. 7.

With particular reference to FIG. 8, the cathode supports 19 provide electrical contacts and are suitably of mild steel. A plurality of insulation and anode supports 20 suitably of PVC, house anode feeds 21, suitably of copper or other electrically conductive metal, connected to each anode 10.

Figure 9:
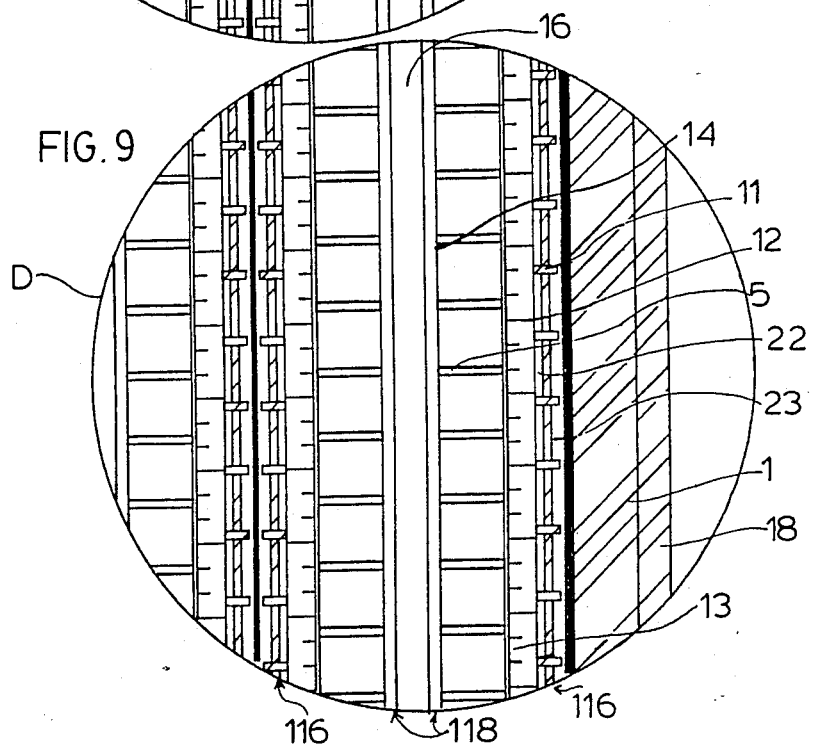
Figure 10:
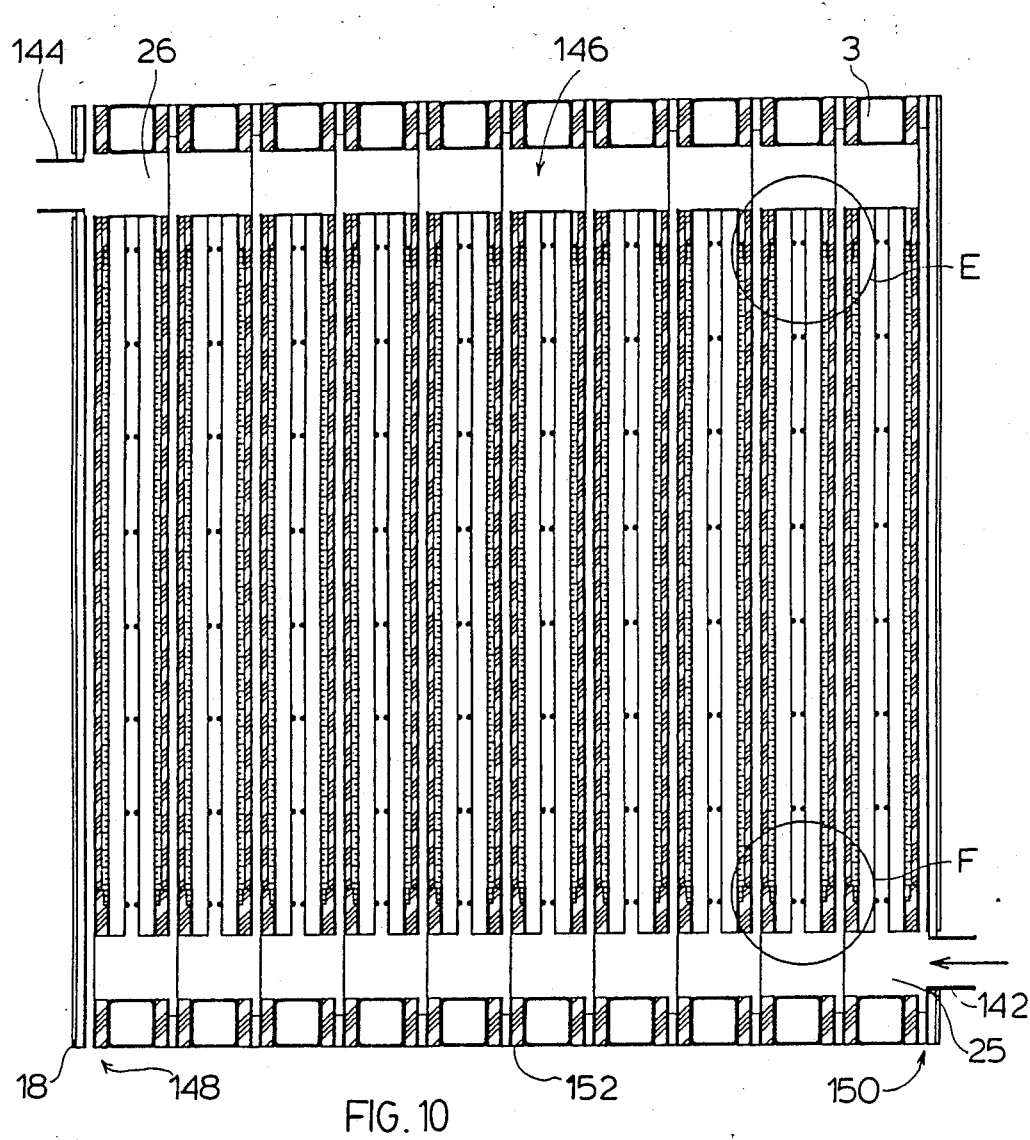
FIG. 10 is a side view of the interior of a plating cell of the system of the invention.

With particular reference to FIG. 9, a mesh 22 suitably of polypropylene is disposed between porous cathode 12 and grid 116.

With particular reference to FIG. 6, a plurality of flow paths 120 in parallel are identified by flow line arrows.

With further reference to FIGS. 10 to 15, a plating cell 140 has an inlet 142 and an outlet 144. Where parts of cell 140 are identical to those of cell 100 the same numbers are employed.

Cell 140 includes a plurality of inflow compartments 25 one of which communicates directly with inlet 142, and a plurality of outflow compartments 26 one of which communicates directly with outlet 144.

Cell 140 houses a plurality of electrode assemblies 146 including end assemblies 148 and 150 and a plurality of intermediate assemblies 152.

Each electrode assembly 146 includes a porous cathode 12 from cell 100, loaded with heavy metal and which functions as an anode of cell 140, and a sheet form cathode 28 of a metal which forms an oxide film, for example, stainless steel or titanium.

The electrode assemblies 146 include grids 154 and 156 similar to grids 116 and 118 of the cell 100.

Figure 11:
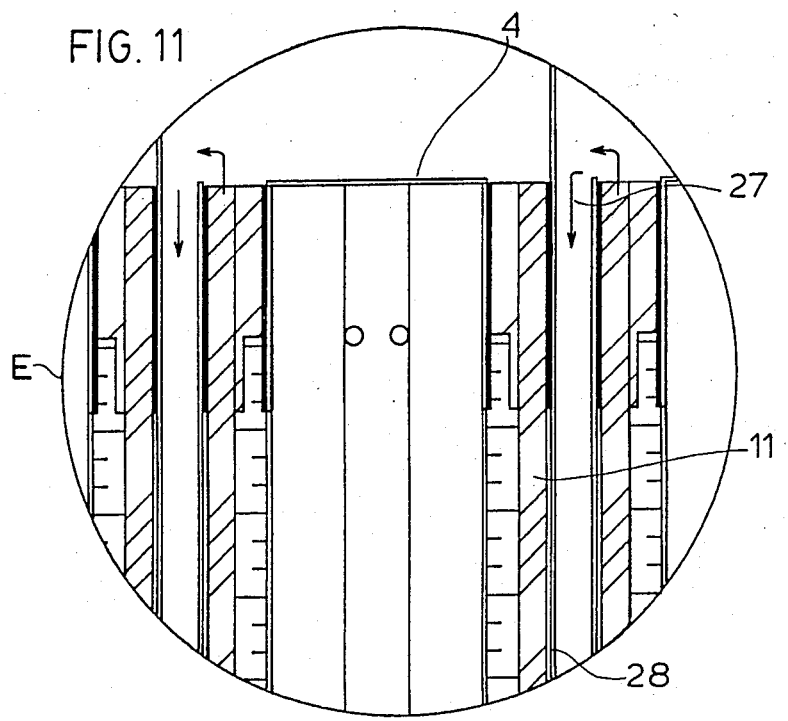
FIGS. 11 and 12 are enlarged views of details E and F, respectively of FIG. 10.
Figure 12:
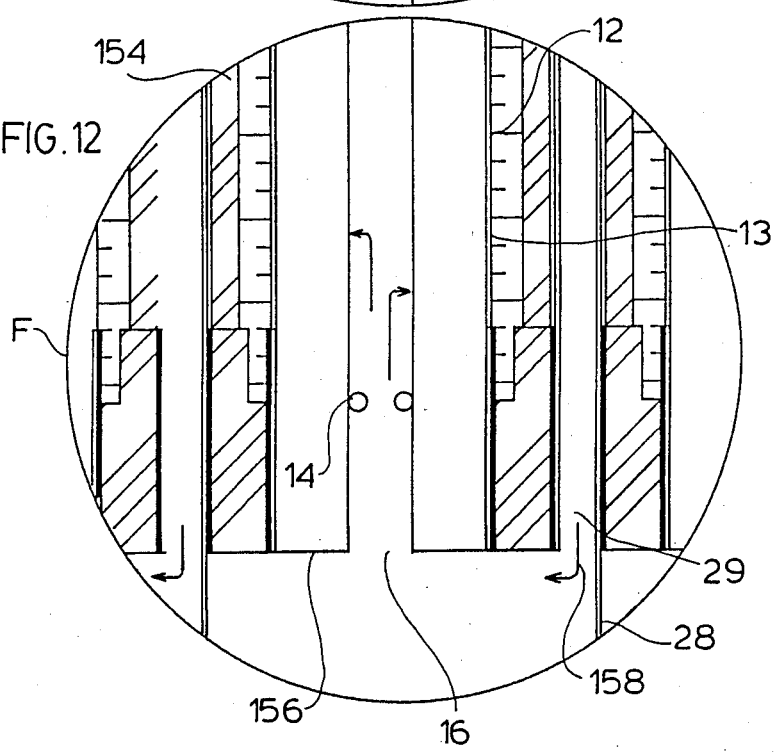
Figure 13:
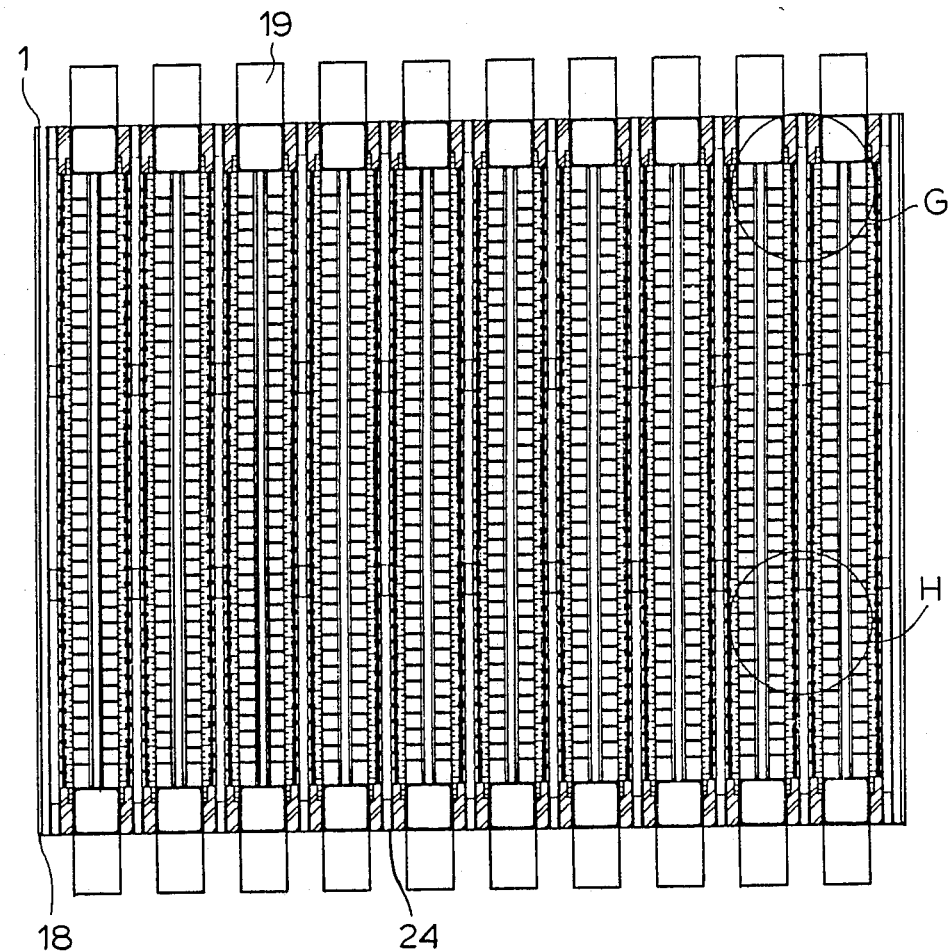
FIG. 13 is a top plan view showing the interior of the cell of FIG. 10.
Figure 14:
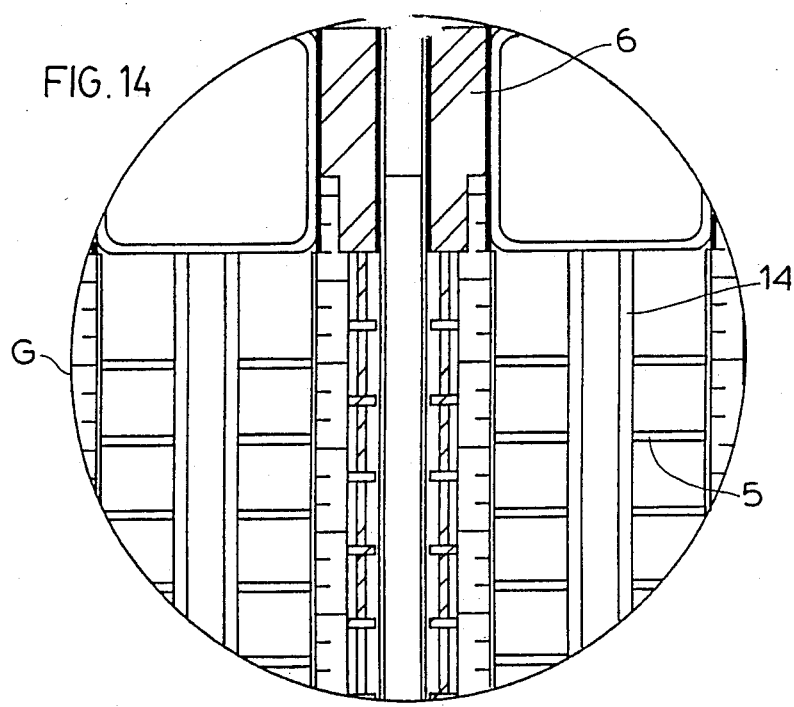
FIGS. 14 and 15 are enlarged views of details G and H, respectively of FIG. 13.
Figure 15:
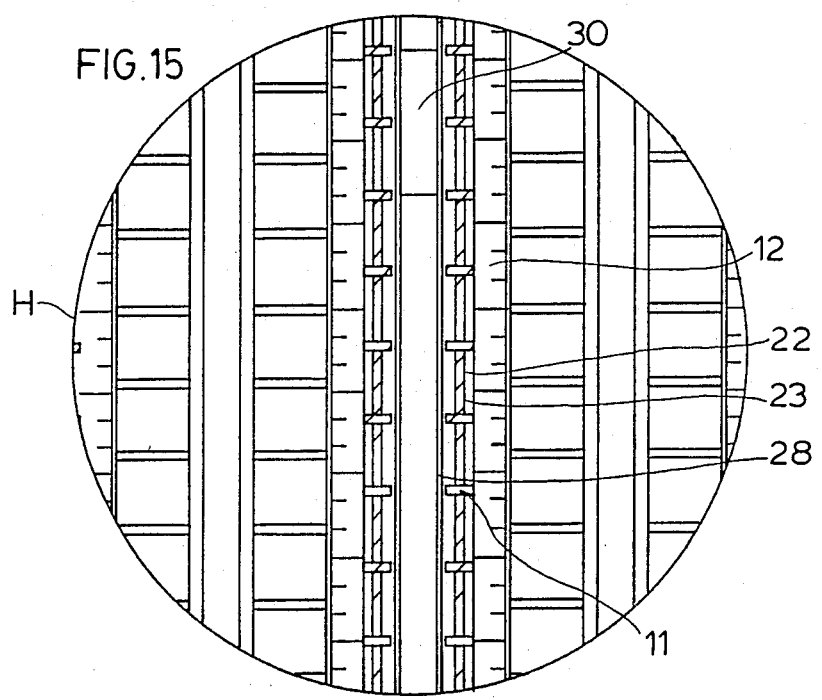

As more particularly shown in FIGS. 11 and 12, a downflow passage 27 having an outlet end 29 is defined between adjacent cathodes 28 and an up-flow passage 16 is defined between adjacent grids 156. A flow path 15 as shown by flow arrows, extends in serial manner across cell 140.

The passages 16 are closed by caps 4 adjacent compartments 26 and thus the flow path 158 extends downwardly of passage 27 into a compartment 25, upwardly of a passage 16, through an anodic cathode 12 into grid 154 between such anode 12 and cathode 28 and thence into a compartment 26 where it continues to the next downflow passage 27.

Thus in a particular embodiment the cell 100 consists of ten (10) cathodes 12 and eleven (11) anodes 10. The cathodes 12 and anodes 10 are pressed together between the end plates 1 and the resulting assembly is compressed between end plates 18 which thus provide the rigidity which cell 100 needs to ensure a uniform separation of each anode 10 and its associated cathode 12.

Each cathode 12 has opposed porous surfaces, the geometric integrity and planarity of which is maintained by there being contained between the three-dimensional grids 116 and 118.

The cathode assembly 114 includes the cathode feeder 3 suitably of box section mild steel, which acts as a frame and a means of distributing electrical current to grid 118. The expanded metal feeder sheet 13 is welded onto the vertical member 5 of grid 118. Feeder sheet 13 acts as a current distributor to the porous cathode 12 and as a physical constrain to ensure that the porous cathode 12 retains a uniform thickness.

The porous cathode 12 is pressed against the feeder sheet 13 by the three-dimensional grid 116, suitably of PVC; the polypropylene mesh 22 between grid 116 and cathode 12 ensures the planarity of the surface of cathode 12 facing anode 10.

Grid 116 is attached to frame 6, suitably of PVC, which is suitably bolted through feeder sheet 13 to a corresponding frame 6 of the adjacentcathode assembly 114. Gasket 7 is interposed between frame 6 and feeder sheet 13. The electrode assemblies 106 are supported by the cathode feeders 3 which act as electrical contacts.

The anode 10 suitably consists of a titanium sheet coated with one or more metal oxides to produce a dimensionally stable anode of a type produced by Eltech Corporation of Cleveland, Ohio. The current to the anodes 10 is distributed by anode feeds 21, suitably four copper strips riveted on each face at either side of an anode 10.

The anode 10 is supported by the insulation and anode supports 20 on either side which also electrically insulate the anode 10 from the cathodic bussing.

The cell 140 is employed to strip the heavy metal from the loaded cathodes 12 of the cell 100 and to deposit the heavy metal as a sheet on sheet form cathode 28, such sheet of heavy metal thereafter being peeled off. In this way the anodic cathode 12 having been cleaned or liberated of the heavy metal is regenerated for use in cell 100.

The cell 140, in a particular embodiment, includes ten (10) anodic cathodes 12 and eleven (11) sheet form cathodes 28. The electrode assemblies 146 of cell 140 are pressed between end plates 1, suitably of PVC and compressed between end plates 18, suitably of steel in the same manner as for cell 100.

The sheet form cathode 28 is of a metal which forms a protective oxide layer or film, for example, stainless steel or titanium. The cathode 28 is welded to feeders 24, 30, suitably of mild steel which act to distribute current and to aid in maintaining the rigidity and planarity of the cathode 28.

In operation the leaching solution after it has been passed through the precious metal recovery system is now termed barren solution. The barren solution enters the electrochemical cell 100 through the inlet 102 and passes into the in-flow passage 17.

The solution passes through the cell 100 in parallel flow paths 120. The distribution of the solution through the cell 100 is governed by the pressure drop associated with each possible flow path 120. The only significant pressure drop in the system is that across the face of the porous cathode material of cathode 12. This ensures that each electrode receives a similar flow of solution. Any imbalance is self correcting as an increase in flow through any electrode will result in greater deposition and a consequent rise in the pressure across the electrode.

From the in-flow passage 17 the solution passes up into the flow passage 16 where its exit is blocked at the top by cap 4. The solution exits through the faces of the cathode 12 through the grid 118, the expanded feeder sheet 13, the porous cathode 12, the polypropylene mesh 22 and into the grid 116.

The solution passes up the grid 116 between the anode and the cathode 12 and into the out-flow passage 2 from where it exits via outlet 104 in the endplates 1 and 18.

The solution flow in the cell 140 is in series.

The solution enters the cell 140 through inlet 142 and from there flows into an end in-flow compartment 25. The solution then passes up the inside of the cathode 28, where its exit from the top is blocked by a cap 4. The solution exits from the flow passage 16 by passing through the expanded feeder sheet 13, porous loaded anodic cathode 12 and polypropylene mesh 22 and into the grid 154.

The solution then passes up the grid 154 and exits at the top into an out-flow compartment 26. The solution then enters a passage 27 that exists between the two faces of the cathode 28 and exits at 29 into an in-flow compartment 25 of an adjacent assembly 146. This is repeated until the solution exits from the end assembly 148 and returns to a strip tank from where it is recycled.

I claim:

1. A method for treating a barren solution from a precious metal mill to remove heavy metal contamination and free complexed cyanide comprising:

passing the barren solution through a porous cathode and across the surface of an anode of an electrochemical cell, said anode being impermeable to said barren solution, maintaining a potential difference between said cathode and said anode to effect electrochemical deposition of said heavy metal in said porous cathode, and recovering a solution rich in free cyanide and poor in heavy metal, said cathode comprising a porous material having a high electrochemically active surface area per unit volume, stable in acid and alkaline media.

2. A method according to claim 1, in which said porous cathode is an electrically conductive carbon fibre felt and said anode is a dimensionally stable electrode based on a titanium core.

3. A method according to claim 1, in which said porous cathode is an electrically conductive reticulated carbon and said anode is a dimensionally stable electrode based on a titanium core.

4. A method according to claim 1, in which said heavy metal is copper.

5. A method according to claim 1 in which the step of passing comprises flowing said barren solution along a flow path, said porous cathode being disposed in said flow path for flow of barren solution therethrough, and said anode defining a wall of said flow path for flow of solution thereagainst.

6. A method according to claim 5 wherein said flow path is defined in an electrochemical cell between a solution inlet and a solution outlet, said electrochemical cell including an inflow passage in flow communication with said inlet and an outflow passage in flow communication with said outlet, and a plurality of flow passages extending in parallel from said inflow passage towards said outflow passage, said flow passages being closed adjacent said outflow passage, a said porous cathode associated with each of said plurality of flow passages, and each of said flow passage being in flow communication with said outflow passage through a said associated porous cathode.

7. A method for treating a barren solution from a precious metal mill to free complexed cyanide and remove heavy metal contaminant and recover the heavy metal in sheet form comprising:

passing a barren solution containing cyanide ions complexed with heavy metal, said barren solution being recovered from a precious metal mill, through a porous cathode and across the surface of an anode of a first electrochemical cell, said cathode comprising a porous material having a high electrochemically active surface area per unit volume and stable in acid and alkaline media when used cathodically and anodically, and said anode being impermeable to said barren solution, maintaining a potential difference between said cathode and said anode to effect electrochemical deposition of said heavy metal in said porous cathode to form a heavy metal loaded cathode and a treated solution rich in free cyanide and poor in heavy metal, recovering said solution rich in free cyanide, removing the heavy metal loaded cathode from said cell and disposing said loaded cathode in a second electrochemical cell containing an aqueous electrolyte, as an anode of said second cell, said second cell having a sheet metal cathode, establishing a potential difference between said anode and cathode of said second cell effective to dissolve the heavy metal from the anodic loaded cathode in the electrolyte and redeposit the dissolved heavy metal as a sheet on said sheet metal cathode, and removing the sheet of heavy metal from said sheet metal cathode.

8. A method according to claim 7, wherein said heavy metal is selected from copper, cadmium and zinc and said porous cathode is an electrically conductive carbon fibre felt.

9. A method according to claim 8, wherein said barren solution passes through said porous cathode at a flow rate of 5–20 cm/sec.

10. A method according to claim 9, wherein fresh barren solution is continually cycled to said electrochemical cell from a precious metal mill and said treated solution is continually recycled to said precious metal mill as leaching solution.

11. A method according to claim 10 in which the step of passing comprises flowing said barren solution along a flow path, said porous cathode being disposed in said flow path for flow of barren solution therethrough, and said anode defining a wall of said flow path for flow of solution thereagainst.

12. A method according to claim 11 wherein said flow path is defined in an electrochemical cell between a solution inlet and a solution outlet, said electrochemical cell including an inflow passage in flow communication with said outlet, and a plurality of flow passages extending in parallel from said inflow passage towards said outflow passage, said flow passages being closed adjacent said outflow passage, a said porous cathode associated with each of said plurality of flow passages, and each of said flow passages being in flow communication with said outflow passage through a said associated porous cathode.

13. An apparatus for treating a barren solution from a precious metal mill to remove heavy metal contamination and free complexed cyanide comprising:

an electrochemical cell having an anode and a porous cathode therein, said anode being impermeable to the barren solution, an inlet for flow of barren solution contaminated with heavy metal and containing complexed cyanide into said cell, and an outlet for discharge of treated solution rich in free cyanide and poor in heavy metal from said cell, a flow path in said cell extending from said inlet to said outlet, said porous cathode being disposed in said flow path for flow of solution therethrough and said anode defining a wall of said flow path for flow of solution thereagainst.

14. An apparatus according to claim 13, wherein said cell comprises a plurality of electrode assemblies, each assembly comprising a said anode spaced from a said porous cathode and a said flow path associated with each assembly.

15. An apparatus according to claim 14, wherein each said anode is a dimensionally stable anode having a titanium core and each said cathode is an electrically conductive carbon fibre felt.

16. An apparatus according to claim 14 wherein said electrochemical cell includes an inflow passage in flow communication with said inlet and an outflow passage in flow communication with said outlet, and a plurality of flow passages extending in parallel from said inflow passage towards said outflow passage, said plurality of flow passages being closed adjacent said outflow passage, an electrode assembly of said plurality of electrode assemblies being associated with each flow passage of said plurality of flow passages, each said flow passage of said plurality being in flow communication with said outflow passage through a porous cathode of a said associated electrode assembly.

17. An electrochemical recovery system comprising:
a first circuit for electrochemically removing heavy metal from a barren solution from precious metal mill to produce a treated solution rich in free, uncomplexed cyanide and poor in heavy metal, and
a second circuit for plating the removed heavy metal as a metal sheet.

18. A system according to claim 17, wherein said first circuit includes a first electrochemical cell containing a plurality of electrode assemblies, each assembly of said plurality comprising a dimensionally stable anode spaced from a porous cathode and a flow path for barren solution associated with each assembly, the porous cathode of an assembly being disposed in the flow path of such assembly for flow of the solution therethrough and the anode of such assembly defining a wall of such flow path for flow of the solution thereagainst.

19. A system according to claim 18, wherein said porous cathode of each of said plurality of electrode assemblies comprises an electrically conductive carbon fibre felt.

* * * * *